United States Patent [19]

Saito et al.

[11] Patent Number: 4,984,780
[45] Date of Patent: Jan. 15, 1991

[54] STACKER FOR STIMULABLE PHOSPHOR SHEETS

[75] Inventors: Yuuji Saito; Makoto Ogoda, both of Kanagawa, Japan

[73] Assignee: Fuji Photo Film Co., Ltd., Kanagawa, Japan

[21] Appl. No.: 325,261

[22] Filed: Mar. 17, 1989

[30] Foreign Application Priority Data

Mar. 18, 1988 [JP] Japan .................................. 63-65057

[51] Int. Cl.⁵ ........................................... B65H 39/11
[52] U.S. Cl. ..................................... 271/292; 271/213
[58] Field of Search ............... 271/292, 293, 294, 295, 271/213

[56] References Cited

U.S. PATENT DOCUMENTS 4,332,377  6/1982  DuBois ............................. 271/294 X
4,337,936  7/1982  Lawrence .......................... 271/293

Primary Examiner—Richard A. Schacher
Attorney, Agent, or Firm—Sughrue, Mion, Zinn, Macpeak & Seas

[57] ABSTRACT

A stacker for storing a plurality of stimulable phosphor sheets has a plurality of stock plates defining a plurality of sheet bins for storing the stimulable phosphor sheets respectively therein. The stock plates are slidably supported on and between two holder members. One of the sheet bins is selected and relatively brought into confronting relation to a feed roller pair. The stimulable phosphor sheet stored in the selected sheet bin can be displaced toward the feed roller pair by displacing the stock plate which defines the selected sheet bin.

14 Claims, 4 Drawing Sheets

STACKER FOR STIMULABLE PHOSPHOR SHEETS

BACKGROUND OF THE INVENTION

The present invention relates to a stacker for stimulable phosphor sheets, and more particularly to a stacker for temporarily storing a stack of stimulable phosphor sheets, the stacker having stock plates for placing the stimulable phosphor sheets thereon, the stock plates being displaceable in a prescribed direction to feed a desired stimulable phosphor sheet to a feed means and to position the stimulable phosphor sheet with reference to one side thereof.

There has recently been known a radiation image information recording and reproducing system for producing the radiation-transmitted image of an object using a stimulable phosphor material capable of emitting light upon exposure to stimulating rays. When a certain phosphor is exposed to a radiation such as X-rays, $\alpha$-rays, $\beta$-rays, $\gamma$-rays, cathode rays, or ultraviolet rays, the phosphor stores a part of the energy of the radiation. When the phosphor exposed to the radiation i subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having layer of stimulable phosphor and then the stimulable phosphor sheet is scanned with stimulating rays such as a laser beam to cause the stimulable phosphor sheet to emit light representative of the radiation image. The emitted light is then photoelectrically detected to produce an image information signal that is electrically processed for generating image information which is recorded as a visible image on a recording medium such as a photosensitive material or displayed as a visible image on a CRT or the like.

The radiation image recorded on the stimulable phosphor sheet is read in the radiation image recording and reproducing system as follows:

The radiation image recording and reproducing system includes an image reader for two-dimensionally scanning the stimulable phosphor sheet with a light beam such as a laser beam to cause the stimulable phosphor sheet to emit light, and detecting the light in time series with a light detector such as a photomultiplier to obtain image information. The stimulable phosphor sheet is usually two-dimensionally scanned by deflecting the light beam and applying the deflected light beam to the stimulable phosphor sheet in a main scanning direction, and simultaneously feeding the stimulable phosphor sheet mechanically on a conveyor belt or the like in an auxiliary scanning direction substantially normal to the main scanning direction.

After a stimulable phosphor sheet has been removed from a cassette and image information has been read from the stimulable phosphor sheet, the stimulable phosphor sheet is delivered to an eraser unit in which any residual image information is erased from the stimulable phosphor sheet. Thereafter, the stimulable phosphor sheet is stored back into the cassette for reuse. The cassette remains loaded in the image reader after the stimulable phosphor sheet has been removed and until it is placed again into the cassette. Therefore, while residual image information is being erased from the stimulable phosphor sheet, a process of reading an image from a next stimulable phosphor sheet cannot be effected, and hence the image reader cannot be put to efficient use.

One solution to the above problems is to provide a stacker in the image reader for holding a stack of stimulable phosphor sheets. The stacker holds stimulable phosphor sheets after image information has been read and erased therefrom. In operation, a cassette is loaded in the image reader and then a stimulable phosphor sheet stored in the cassette is removed, after which a stimulable phosphor sheet from which residual image information has been erased is removed from the stacker and stored into the cassette, which can then be unloaded from the image reader. Therefore, another cassette storing a next stimulable phosphor sheet can be loaded into the image reader, and image information borne by the stimulable phosphor sheet can be read by the image reader. As a consequence, the image reader can be used efficiently.

The stacker is arranged such that a stimulable phosphor sheet can be stored therein from one end of the stacker and can be removed therefrom from the opposite end of the stacker. The image reader must have stimulable phosphor sheet feed means at both ends of the stacker. With such stimulable phosphor sheet feed means incorporated, the image reader is considerably large in size.

When removing a stimulable phosphor sheet from the stacker, the stimulable phosphor sheet may be positionally displaced in its transverse direction. The displaced stimulable phosphor sheet cannot smoothly be fed by the feed means. The stimulable phosphor sheet removed from the stacker with such a positional error is placed out of a proper reading position in the process of reading image information from the stimulable phosphor sheet. As a result, image information cannot accurately be read from the stimulable phosphor sheet.

SUMMARY OF THE INVENTION

It is a primary object of the present invention to provide a stacker for storing a plurality of stimulable phosphor sheets, the stacker having a plurality of stock plates defining sheet bins for holding the stimulable phosphor sheets, respectively, a first displacing means for displacing the sheet bin defined by a desired one of the stock plates to position the sheet bin with respect to a feed means, a second displacing means for displacing the sheet bin selected and positioned by the first displacing means toward the feed means, and a positioning means for transversely positioning the stimulable phosphor sheet when the stimulable phosphor sheet is sent to the feed means by the second displacing means, so that a device incorporating the stacker will be reduced in size, the stimulable phosphor sheet can smoothly be shifted in the transverse direction so as to be positioned in a desired position at all times for easy removal from the stacker, and the stimulable phosphor sheet can be placed accurately in a reading position without undesirable positional displacement to allow accurate image reading operation.

Another object of the present invention is to provide a stacker for storing a plurality of stimulable phosphor sheets, comprising: a sheet storage assembly having a plurality of stock plates defining a plurality of sheet bins for storing the stimulable phosphor sheets respectively therein; a holder member holding said sheet storage assembly; displacing means for selecting one of said sheet bins and relatively bringing the selected sheet bin into confronting relation to a sheet feed means; and said stock plates having respective selective displacing mean for selectively moving a desired stock plate toward said sheet feed means.

Still another object of the present invention is to provide a stacker wherein said displacing means comprises first displacing means for displacing said holder members back and forth to select a desired one of said sheet bins with respect to said sheet feed means, and second displacing means for engaging the selective displacing means of the stock plate which defines said desired one of the sheet bins to displace the stock plate back and forth with respect to said sheet feed means.

Yet another object of the present invention is to provide a stacker wherein said second displacing means comprises a linear actuator.

Yet still another object of the present invention is to provide a stacker wherein said linear actuator comprises a cylinder.

A further object of the present invention is to provide a stacker wherein said linear actuator comprises a linear solenoid.

A yet further object of the present invention is to provide a stacker wherein said second displacing means comprises an actuator, a swing member swingable by said actuator, an engaging pin mounted on an end of said swing member, said selective displacing means comprising engaging members mounted on said stock plates, respectively, the arrangement being such that said engaging pin is brought into engagement with the engaging member of the stock plate, and said actuator is operated to angularly displace said swing member to displace said stock plate back and forth with respect to said sheet feed means through said engaging member and said engaging pin.

A still further object of the present invention is to provide a stacker wherein said sheet storage assembly has positioning means for positioning the stimulable phosphor sheets stored in said sheet bins, respectively, said positioning means comprising positioning members each movable in synchronism with displacement of the desired stock plate with respect to said sheet feed means for displacing the sheet on the stock plate transversely into a prescribed position.

A yet still further object of the present invention is to provide a stacker wherein said positioning members are swingably mounted on said stock plates, respectively, said holder member having lands engageable with said positioning members, respectively, the arrangement being such that when the desired stock plate is displaced with respect to said sheet feed means, said positioning member on the stock plate engages the corresponding land to displace the sheet on the stock plate transversely into said prescribed position.

Another object of the present invention is to provide a stacker wherein said sheet storage means further includes auxiliary positioning members connected to said positioning members, respectively, through joint members for transversely displacing the sheets on the stock plates.

A further object of the present invention is to provide a stacker wherein said stock plates are inclined vertically upwardly with respect to said sheet feed means and supported on said holder member for swinging movement, said sheet storage assembly further including stopper members positionally selectively mounted on said stock plates.

A still further object of the present invention is to provide a stacker wherein said stock plates have respective recesses defined in ends thereof, with the sheets respectively on said stock plates having ends positioned over said recesses, the arrangement being such that the end of the sheet positioned over the recess in the desired stock plate over is moved toward said sheet feed means by displacing the stock plate toward said sheet feed means.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
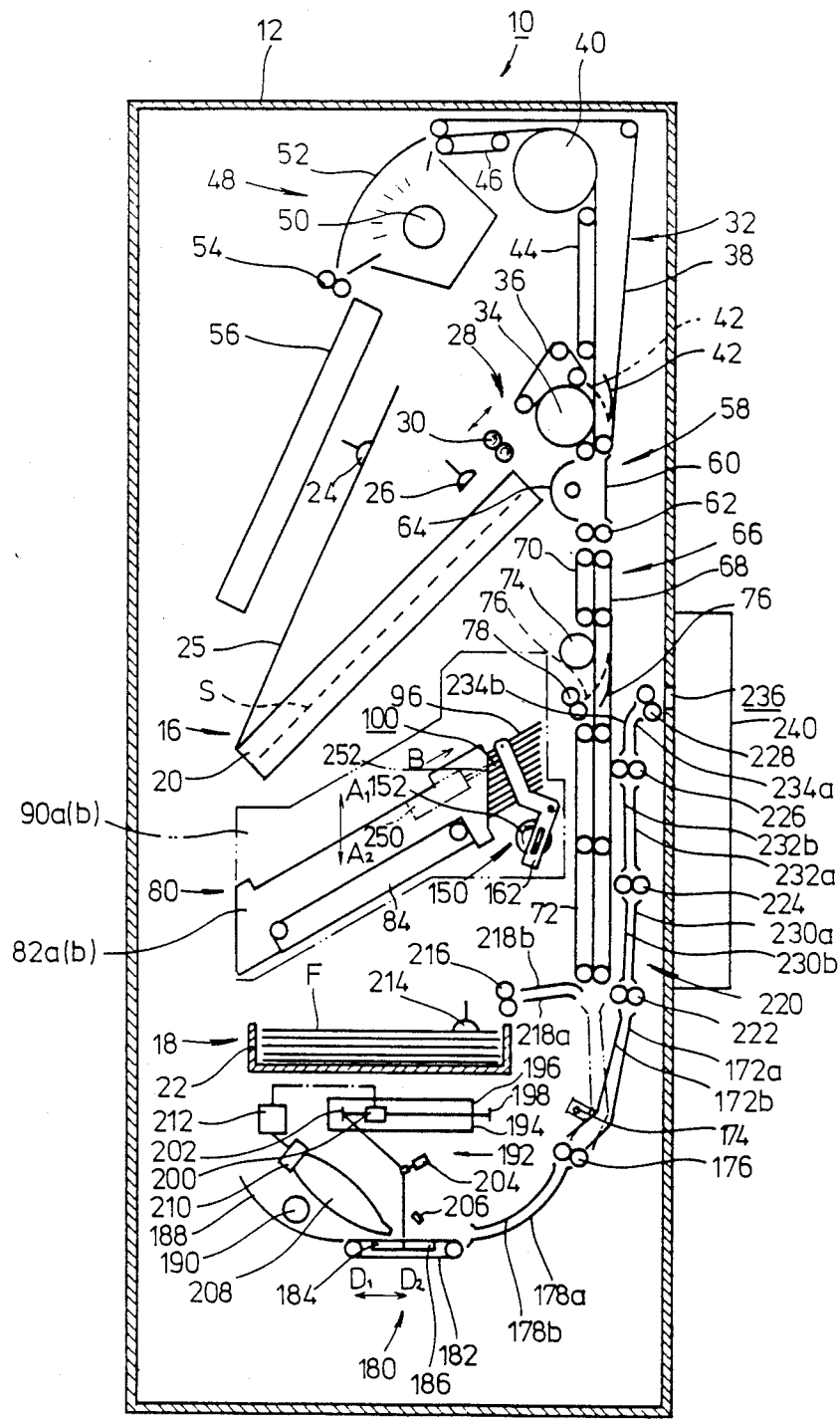
FIG. 1 is a schematic elevational view of an image reading and reproducing system incorporating a stacker for storing stimulable phosphor sheets according to the present invention.

FIG. 1 shows an image reading and reproducing system, generally designated by the reference numeral 10, which incorporates therein a stacker for storing a plurality of stimulable phosphor sheets according to the present invention. The image reading and reproducing system 10 includes a vertically elongated housing 12 having a first loading unit 16 and a second loading unit 18. A stimulable phosphor sheet S contained in a cassette 20 or a stack of stimulable phosphor sheets S contained in a sheet magazine (no shown) is detachably loaded in the first loading unit 16, whereas a stack of photosensitive films F contained in a film magazine 22 is detachably loaded in the second loading unit 18.

The first loading unit 16 includes a lid opening mechanism having a suction cup 24 connected to a vacuum suction device (not shown) for attracting a lid 25 of the cassette 20 and opening the lid 25. The first loading unit 16 also includes a sheet delivery mechanism including a suction cup 26 positioned on one side of the cassette 20 for removing a stimulable phosphor sheet S from the cassette 20 with its lid 25 open. A stimulable phosphor sheet S which has been removed from the cassette 20 by the suction cup 26 is delivered along a predetermined path, and then supplied to a first feed means 28. The first feed means 28 comprises a pair of rollers 30 which are displaceable toward the suction cup 26 as indicated by one of the arrowheads for gripping the stimulable phosphor sheet S, and also displaceable away from the suction cup 26 as indicated by the other arrowhead for supplying the stimulable phosphor sheet S toward a second feed means 32.

The second feed means 32 comprises a larger-diameter drum 34, a first feed belt 36 held in contact with the drum 34, and a second feed belt 38 held in contact with the drum 34. The first feed belt 36 is trained around three rollers and has a portion held against the drum 34.

The second feed belt 38 extends vertically upwardly out of contact with the drum 34, and is bent substantially perpendicularly so as to extend substantially horizontally along an inner surface of an upper panel of the housing 12. The second feed belt 38 remains bent around a larger-diameter roller 40. A first switching guide member 42 is disposed in an area where the second feed belt 38 and the drum 34 are held against each other. A third feed belt 44 is held against a vertical run of the second feed belt 38, and a fourth feed belt 46 is disposed underneath and in contact with a horizontal run of the second feed belt 38.

An eraser unit 48 is positioned in the vicinity of the distal end of the fourth feed belt 46. The eraser unit 48 comprises an erasing light source 50 such as a sodium-vapor lamp, a tungsten lamp, or a xenon lamp, a guide panel 52 for guiding the stimulable phosphor sheet S, and a roller pair 54 disposed beneath the guide panel 52. A tray 56 is positioned below the roller pair 54. When a sheet magazine storing a plurality of stimulable phosphor sheets S is loaded in the first loading unit 16, the tray 56 stores the stimulable phosphor sheets S after recorded images have been read from the stimulable phosphor sheets S fed from the sheet magazine and residual image information has been erased from the stimulable phosphor sheets S by the eraser unit 48.

A third feed means 58 comprises a guide panel 60 disposed below the second feed means 32, and a roller pair 62 is located near the lower end of the guide panel 60. An auxiliary eraser unit 64 is provided near the third feed means 58.

A fourth feed means 66 is disposed downwardly of the roller pair 62. The fourth feed means 66 comprises a relatively long fifth feed belt 68 extending vertically downwardly, a relatively short sixth feed belt 70 held in contact with an upper portion of the fifth feed belt 68, and a seventh feed belt 72 held against a lower portion of the fifth feed belt 68. A roller 74 of a relatively large diameter is held in rolling contact with a intermediate portion of the fifth feed belt 68. A second switching guide member 76 is positioned near the roller 74. The second switching guide member 76 can be angularly displaced into a broken-line position to position its tip end near roller pair 78. A stimulable phosphor sheet S which has been fed by the fourth feed means 66 can be introduced into a stacker 80 by the roller pair 78.

Figure 2:
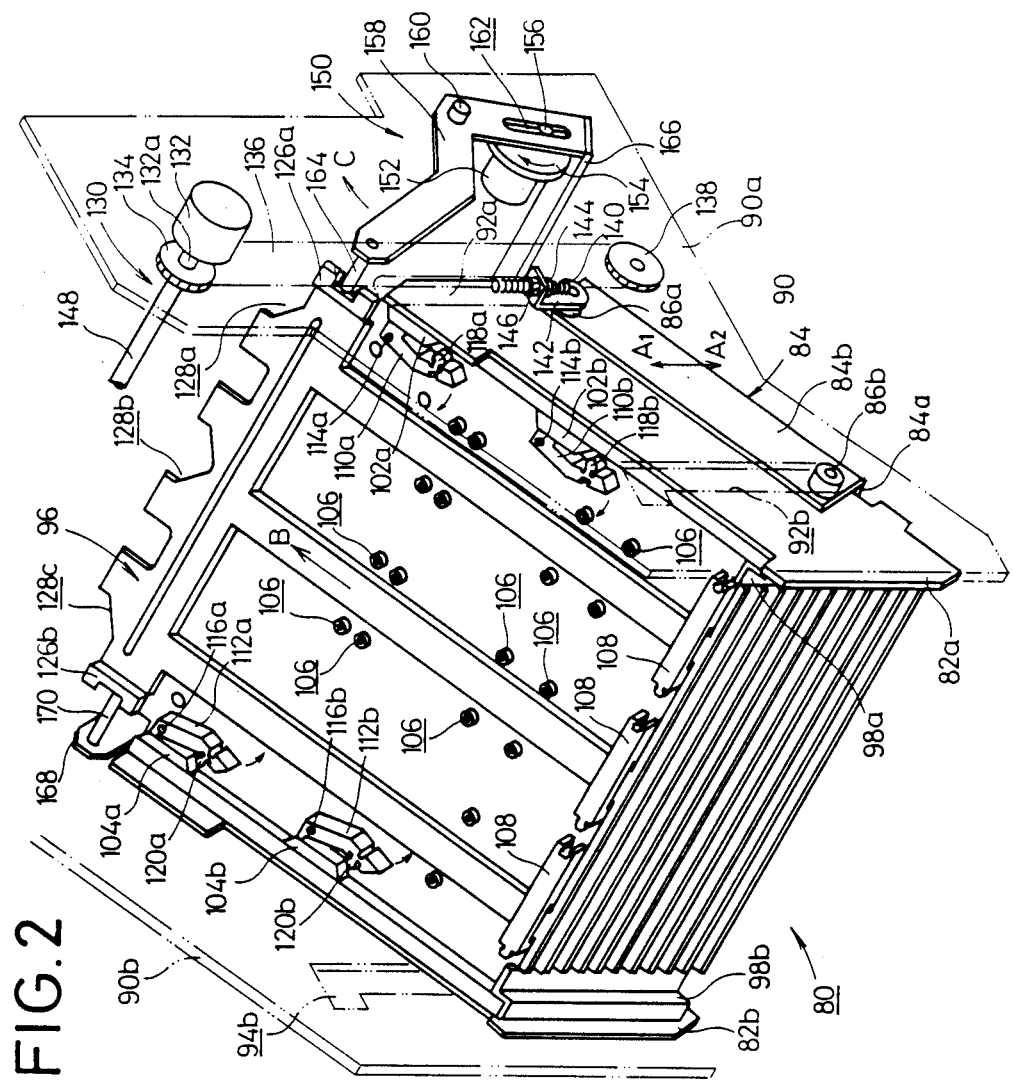
FIG. 2 is an enlarged perspective view of the stacker of the present invention.
Figure 3:
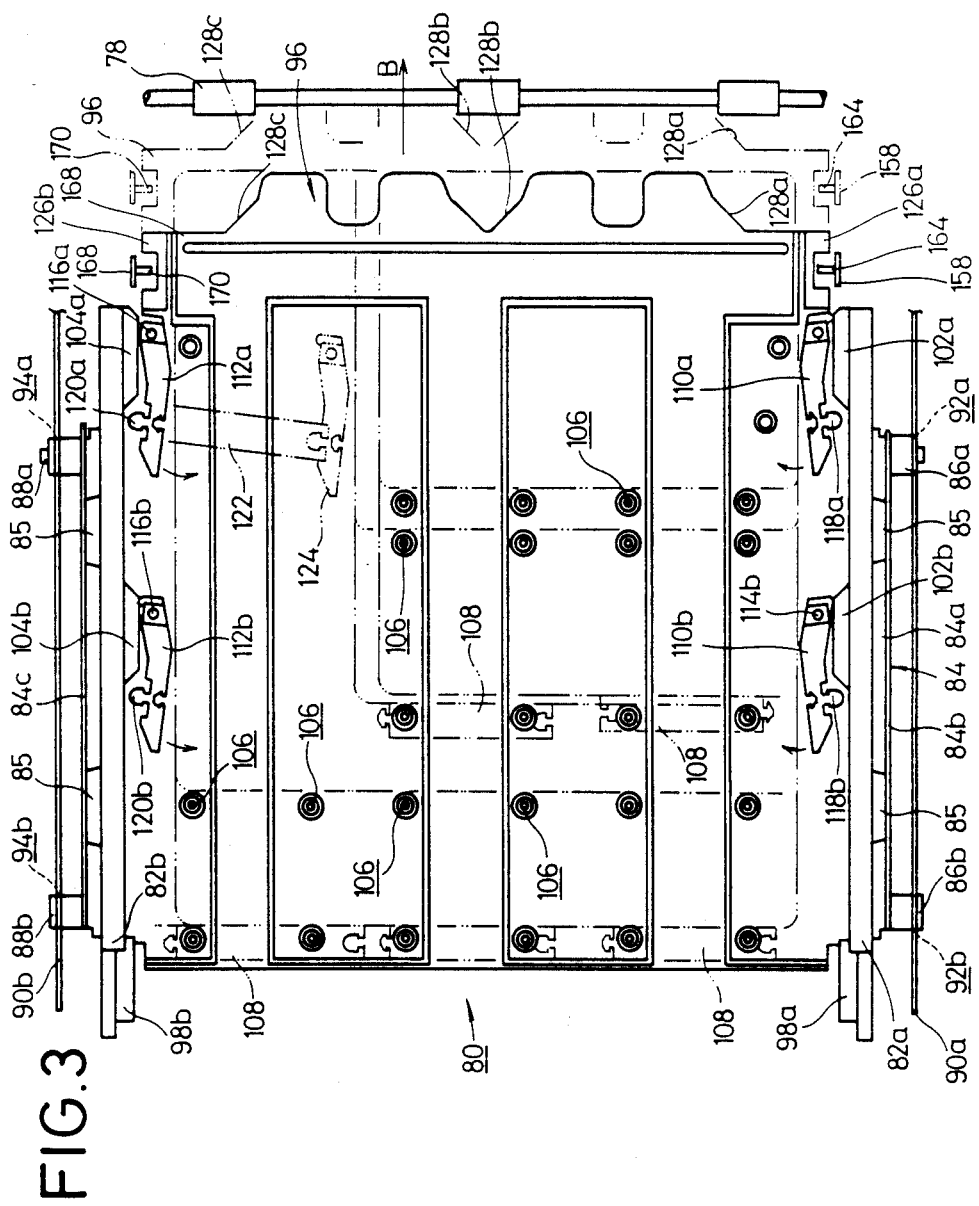
FIG. 3 is a plan view of the stacker shown in FIG. 2.
Figure 4:
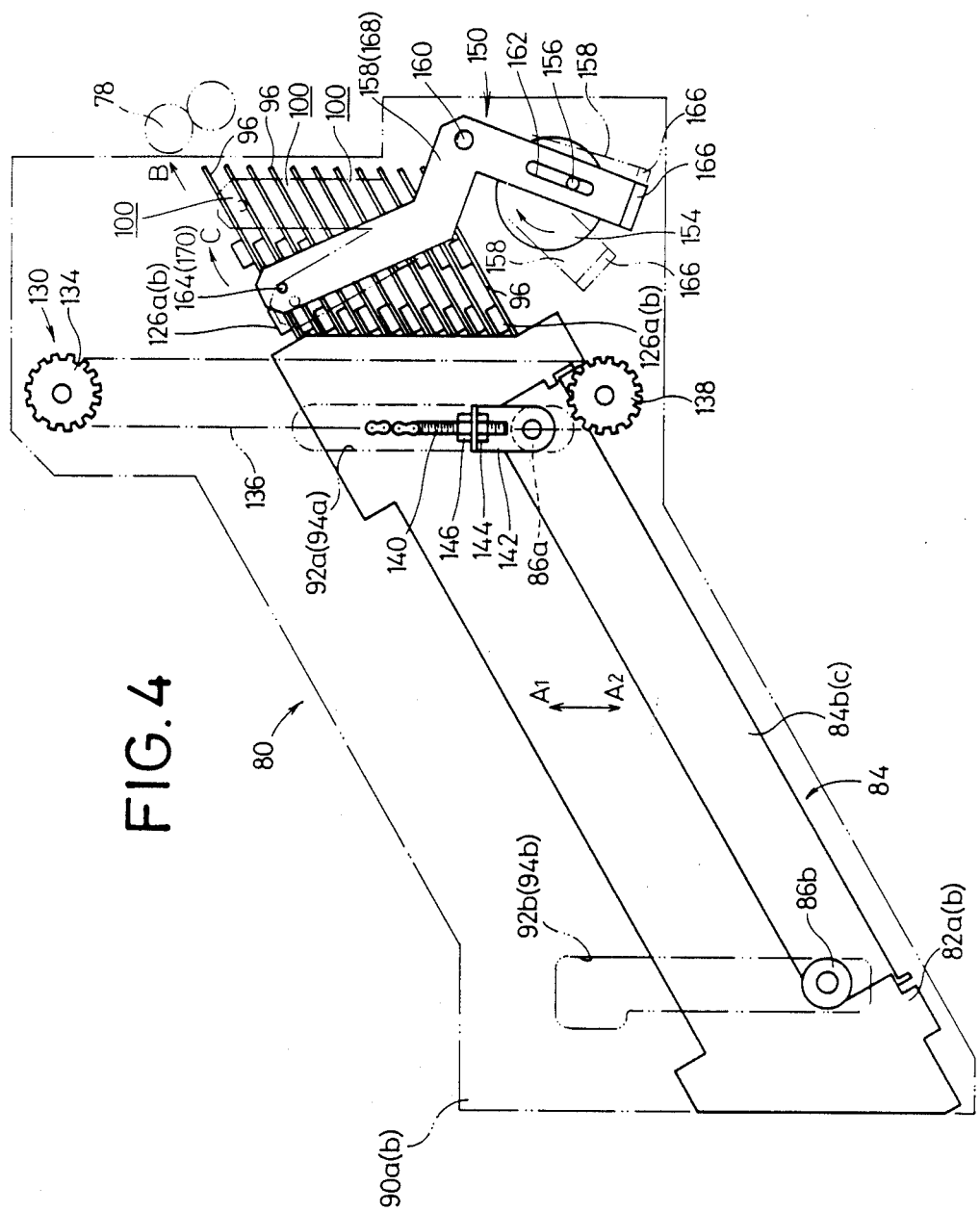
FIG. 4 is a side elevational view of the stacker illustrated in FIGS. 2 and 3.

As shown in FIGS. 2 through 4, the stacker 80 has a sheet storage assembly which includes a pair of holder members 82a, 82b spaced from each other and inclined to the horizontal plane, the holder members 82a, 82b being interconnected by a connecting member 84 engaging the lower edges of the holder members 82a, 82b. The connecting member 84 is of a bent configuration and comprises a bottom plate 84a and a pair of upwardly bent side plates 84b, 84c attached to the respective holder members 82a, 82b with a plurality of spacers 85 interposed therebetween. Outwardly projecting rollers 86a, 86b are mounted on the side plate 84b, whereas outwardly projecting rollers 88a, 88b are also mounted on the side plate 84c. The rollers 86a, 86b are rollingly disposed in vertical slots 92a, 92b, respectively, defined in a side panel 90a, whereas the rollers 88a, 88b are rollingly disposed in vertical slots 94a, 94b, respectively, defined in a side panel 90b.

The holder members 82a, 82b have a plurality of grooves (not shown) defined in their confronting surfaces and inclined upwardly and rightwardly in the direction indicated by the arrow B) with respect to the horizontal direction in FIG. 4. A plurality of stock plates 96 are disposed between the holder members 82a, 82b and have opposite sides slidably engaging in the grooves of the holder 82a and the grooves of the holder 82b. The stock plates 96 lie parallel to each other and are engaged by engaging members 98a, 98b attached to ends of the holder members 82a, 82b, respectively. The holder members 82a, 82b and the stock plates 96 jointly define a plurality of sheet bins 100 (see FIG. 4). The holder member 82a has lands 102a, 102b disposed between the grooves thereof and projecting into the sheet bins 100, and the holder member 82b also has lands 104a, 104b disposed between the grooves thereof and projecting into the sheet bins 100.

As shown in FIG. 3, each of the stock plates 96 has a plurality of holes 106 defined therein and selectively engaging stopper members 108 as indicated by the two-dot-and-dash lines. Each of the stopper members 108 engage adjacent two of the holes 106 for holding a stimulable phosphor sheet S in a predetermined position. By keeping the stopper members 108 in engagement with the stock plate 96 at a desired area through the holes 106, the stimulable phosphor sheet S can be positioned and held at rest in a prescribed area dependent on the size of the stimulable phosphor sheet S. Cam-shaped positioning members 110a, 110b are swingably mounted on a side of each of the stock plates 96 near the holder member 82a, and likewise cam-shaped positioning members 112a, 112b are swingably mounted on the opposite side of the stock plate 96 near the holder member 82b. The positioning members 110a, 110b and 112a, 112b have engaging portions 114a, 114b and 116a, 116b on ends thereof for angularly movably engaging the stock plate 96, and projections 118a, 118b and 120a, 120b on the other ends which are directed toward the holder members 82a, 82b. The projections 118a, 118b can abut against the lands 102a, 102b, respectively, on the holder member 82a when the stock plate 96 is displaced. Similarly, the projections 120a, 120b can abut against the lands 104a, 104b, respectively, on the holder 82b when the stock plate 96 is displaced. Upon the abutment of the projections 118a, 118b, 120a, 120b against the respective lands 102a, 102b, 104a, 104b, the positioning members 110a, 110b, 112a, 112b are angularly moved in the directions indicated by the arrows to transversely position a stimulable phosphor sheet S placed on the stock plate 96. If the stimulable phosphor sheet S is of a smaller width, then an auxiliary positioning member 124 is connected to the positioning member 112a by a joint member 122 for positioning the stimulable phosphor sheet S. A stopper member 108 may be used as the joint member 122, and one of the positioning members 110a, 110b, 112a, 112b may be used as the auxiliary positioning member 124.

Substantially C-shaped engaging members 126a, 126b are mounted as selective displacing means on the opposite sides of each stock plate 96 at one end thereof for engagement with displacing means (described later on). The end of the stock plate 96 has recesses 128a, 128b, 128c defined therein for receiving a plurality of the roller pairs 78 when the stock plate 96 is displaced toward the roller pairs 78.

A first displacing means 130 for displacing the holder members 82a, 82b and the stock plates 96 in the directions indicated by the arrows $A_1$, $A_2$ will be described below. As shown in FIG. 2, the first displacing means 130 includes a motor 132 having a rotatable shaft 132a on which a sprocket 134 is mounted. A chain 136 is trained around the sprocket 134 and another sprocket 138 disposed below the sprocket 134, and has opposite ends joined to each other by an externally threaded member 140. The threaded member 140 engages an angle 142, and nuts 144, 146 are threaded on the threaded member 140 and grip the angle 142 therebetween. The angle 142 are angularly movably attached to a roller 86a mounted on the connecting member 84. A connecting rod 148 is coaxially connected to the rotatable shaft 132a of the motor 132 and extends toward the holder member 82b. The connecting rod 148 is coupled to another displacing means (not shown) disposed near the holder member 82b and having substantially the same construction as the first displacing means 130.

A second displacing means 150 for displacing the stock plates 96 in the direction indicated by the arrow B will be described below. The second displacing means 150 includes a rotative drive source 152 having a rotatable shaft (not shown) on which a disc 154 is mounted, with a pin 156 eccentrically attached thereto. When the disc 154 is rotated by the rotative drive source 152, the pin 156 revolves along a given circular path. The pin 156 engages a swing member 158 of a bent shape which is angularly mounted on a side panel 90a by means of a pin 160 on a bent corner of the swing member 158. The swing member 158 has a slot 162 defined in one end in which the pin 156 is received. An engaging pin 164 is mounted on the other end of the swing member 158 and can engage the engaging member 126a of one of the stock plates 96 which has been selected by the first displacing means 130. A connecting member 166 has one end attached to the swing member 158 and extends toward the holder member 82b. The other end of the connecting member 166 is attached to a swing member 168 which is of substantially the same shape as the swing member 158 and positioned in symmetric relation to the swing member 158. An engaging pin 170 is attached to the swing member 168 for engaging the engaging portion 126b of a selected stock plate 96.

As shown in FIG. 1, a pair of movable guide plates 172a, 172b is disposed downwardly of the fourth feed means 66. The movable guide plates 172a, 172b are swingable in union about a pivot 174 comprising a pin. The lower ends of the movable guide plates 177a, 172b are positioned in confronting relation to a roller pair 176 that is positioned above a pair of curved guide plates 178a, 178b. The guide plates 178a, 178b serve to guide a stimulable phosphor sheet S and a film F toward an auxiliary scanning feed means 180.

The auxiliary scanning feed means 180 is located in a position which is slightly spaced from the sheet feeding and positioning mechanism 84, as shown in FIG. 1. The auxiliary scanning feed means 180 comprises an auxiliary scanning endless feed belt 182 having a plurality of holes (not shown) defined therein, and first and second suction boxes 184, 186 disposed in the endless feed belt 182 for attracting a stimulable phosphor sheet S and a film F fed by the endless feed belt 182, under a vacuum applied through the holes of the feed belt 182. The first and second suction boxes 184, 186 are connected to a vacuum pump or the like (not shown). The auxiliary scanning feed belt 182 serves to feed the stimulable phosphor sheet S and the film F supplied from the guide plates 178a, 178b toward a guide plate 188, and to thereafter feed them in the opposite direction for auxiliary scanning. A roller 190 is positioned near the guide plate 188 for preventing the stimulable phosphor sheet S and the film F from rising off the guide plate 188 due to flexing of the stimulable phosphor sheet S and the film F.

An image reading and recording mechanism 192 is positioned above the auxiliary scanning feed means 180 for reading image information recorded on the stimulable phosphor sheet S and exposing the film F to the image information thus read. The image reading and recording mechanism 192 includes a laser beam source 194 and a mirror 198 disposed on the laser beam emitting side of the laser beam source 194 for reflecting a laser beam 196 emitted from the laser beam source 194. The laser beam 196 reflected by the mirror 198 passes through a light modulator 200 toward another mirror 202. The light modulator 200 is energized only when an image is to be recorded on the film F, and not energized when an image is read from the stimulable phosphor sheet S. The image reading and recording mechanism 192 also including a galvanometer mirror 204 and a light-collecting reflecting mirror 206 for scanning the stimulable phosphor sheet S with the laser beam 190 which has been reflected by the mirror 202.

A light guide 208 which extends along a main scanning line is positioned in the area where the stimulable phosphor sheet S is scanned by the laser beam 196, and a photomultiplier 210 is mounted on an upper end of the light guide 208. The photomultiplier 210 is electrically connected to an image information processing circuit 212. Therefore, an electric signal produced by the photomultiplier 210 is sent to the image information processing circuit 212 for image processing, and a processed image is stored in a memory means or the like. The stimulable phosphor sheet S from which the image has been read by the image reading and recording mechanism 192 is then delivered to the eraser unit 48 through the fourth feed means 66, the third feed means 58, and the second feed means 32.

The second loading unit 18 stores the detachable magazine 22 which contains a stack of films F, as described above. A film delivery mechanism including a suction cup 214 is positioned near a film access opening of the magazine 22. The suction cup 214 serves to deliver one film F at a time from within the magazine 22 and supply the film F to a roller pair 216. A pair of guide plates 218a, 218b is positioned in confronting relation to and slightly spaced from the roller pair 216. The guide plates 218a, 218b have ends facing the movable guide plates 172a, 172b. When the roller pair 216 operates, the film F supplied to the roller pair 216 is transferred through the guide plates 218a, 218b into a position between the movable guide plates 172a, 172b. The film F is then fed in the auxiliary scanning direction indicated by the arrow $D_2$ in substantially the same manner as the stimulable phosphor sheet S. While the film F is being fed in the auxiliary scanning direction, the laser beam 196 is modulated by the light modulator 200 based on the image information read from the stimulable phosphor sheet S, and the film F is exposed to the modulated laser beam 196. The film F to which the image information has been exposed is then fed toward the roller pair 176, after which the film F is guided by the movable guide plates 172a, 172b into a film feed means 220 extending parallel to the fourth feed means 66.

The film feed means 220 includes roller pairs 222, 224, 226, 228 spaced at intervals, a pair of guide plates 230a, 230b disposed between the roller pairs 222, 224, a pair of guide plates 232a, 232b disposed between the roller pairs 224, 226, and a pair of curved guide plates 234a, 234b disposed between the roller pairs 226, 228. The roller pair 228 is positioned near an opening 236 defined in a side panel of the housing 12 of the image reading and reproducing system 10. The film F with an image reproduced thereon which is fed by the film feed mean 220 is sent through the opening 236 into a receiver magazine 240 detachably mounted on the housing 12.

An automatic image developing device may be placed adjacent to the housing 12, and the film F fed from the roller pair 228 may be delivered through the opening 236 into the automatic image developing device for automatically developing the image on the film F.

The stimulable phosphor sheet stacker according to the present invention, and the image reading and reproducing system incorporating the stacker are basically constructed as described above. Now, the stacker and the image reading and reproducing system will operate and offers advantages as follows:

The cassette 20 storing a stimulable phosphor sheet S or the sheet magazine (not shown) storing a stack of stimulable phosphor sheets S is loaded into the first loading unit 16 in the image reading and reproducing system 10. In the illustrated embodiment, the cassette 20 is loaded into the first loading unit 16. The lid 25 of the cassette 20 is opened by the suction cup 24 of the lid opening mechanism under a vacuum applied thereby.

Then, the stimulable phosphor sheet S in the cassette 20 is picked up and removed from the cassette 20 by the suction cup 26, and at the same time the roller pair 30 of the first feed means 28 is displaced toward the suction cup 26, while the rollers of the roller pair 30 are being rotated in the directions indicated by the arrows. The stimulable phosphor sheet S is gripped by the roller pair 30, which is then displaced toward the first feed belt 36 of the second feed means 32 to supply the stimulable phosphor sheet S to the second feed means 32. In the second feed means 32, the stimulable phosphor sheet S is gripped between the drum 34 and the first feed belt 36, and thereafter gripped between the drum 34 and the second feed belt 38 so as to be fed into the third feed means 58. The stimulable phosphor sheet S is then fed from the roller pair 62 of the third feed means 66 into a position between the fifth feed belt 68 and the sixth feed belt 70 of the fourth feed means 66.

At this time, the second switching guide member 76 is angularly displaced toward the broken-line position in FIG. 1, and the stimulable phosphor sheet S is stored into a desired sheet bin 100 in the stacker 80 by the roller pair 78.

More specifically, the motor 132 is energized to rotate the shaft 132a and the sprocket 134 in a certain direction to displace the chain 136 trained around the sprocket 134. The chain 140 is attached to the threaded member 140 which engages the angle 142. Therefore, as the chain 136 is displaced, the roller 86a attached to the angle 142 is rollingly displaced in and along the slot 92a defined in the side panel 90a. Thus, the holder members 82a, 82b are displaced in the direction indicated by the arrow $A_1$ or $A_2$ through the connecting member 84 on which the roller 86a is mounted. At this time, the roller 86b attached to the connecting member 84 also rolls in and along the slot 92b defined in the side panel 90a, and the rollers 88a, 88b roll in and along the slots 94a, 94b defined in the side panel 90b.

By thus displacing the holder members 82a, 82b in the direction indicated by the arrow $A_1$ or $A_2$, the stock plate 96 defining a desired sheet bin 100 is brought into confronting relation to the roller pair 78. A stimulable phosphor sheet S which has been delivered by the roller pair 78 can therefore be transferred onto the stock plate 96 facing the roller pair 78.

Then, the holder members 82a, 82b of the stacker 80 are displaced again in the direction of the arrow $A_1$ or $A_2$ to select the sheet bin 110 which stores a stimulable phosphor sheet bearing other image information, and position the stock plate 96 which defines the selected sheet bin 100 in confronting relation to the roller pair 78. The engaging members 126a, 126b of the stock plate 96 supporting the desired stimulable phosphor sheet S are now engageable with the engaging pins 164, 170, respectively, of the second displacing means 150.

The rotative drive source 152 of the second displacing means 150 is then energized to rotate the disc 154 in the direction of the arrow. The pin 156 on the disc 154 is angularly displaced along the circular path to cause the swing member 158 to swing about the pin 160, thus angularly moving the upper end of the swing member 158 in the direction of the arrow C. Since the swing member 158 is connected to the swing member 168 near the holder member 82b through the connecting member 166, the swing member 168 is also caused to swing with the swing member 158. The engaging pins 164, 170 mounted on the respective swing members 158, 168 are now brought against the engaging members 126a, 126b, respectively of the stock plate 96 to displace the stock plate 96 in the direction of the arrow B.

At this time, the stimulable phosphor sheet S on the stock plate 96 is positioned by such displacement of the stock plate 96. More specifically, when the stock plate 96 is displaced in the direction of the arrow B, the projections 118a, 118b of the positioning members 110a, 110b mounted on the stock plate 96 engage the respective lands 102a, 102b of the holder member 82a, and the projections 120a, 120b of the positioning members 112a, 112b also engage the respective lands 104a, 104b of the holder member 82b. Consequently, the positioning members 110a, 110b and 112a, 112b are angularly moved in the directions of the arrows to grip the stimulable phosphor sheet S placed on the stock plate 96 and position the stimulable phosphor sheet S in its transverse direction.

In response to the displacement of the stock plate 96 in the direction indicated by the arrow B, the roller pairs 78 are received in the respective recesses 128a through 128c. Since the stimulable phosphor sheet S placed on the stock plate 96 is located by the stopper members 108 in covering relation to the recesses 128a through 128c, the upper end of the stimulable phosphor sheet S is gripped by the roller pairs 78 which have entered the recesses 128a through 128c. Then, the roller pairs 78 are operated to supply the stimulable phosphor sheet S into the fourth feed means 66. The stimulable phosphor sheet S is fed upwardly and then downwardly by the fourth feed means 66. At this time, the movable guide plates 172a, 172b are turned to the two-dot-and-dash-line position in FIG. 1 to receive the stimulable phosphor sheet S therebetween.

The stimulable phosphor sheet S supplied between the movable guide plates 172a, 172b is then gripped by the roller pair 176, which is actuated to feed the stimulable phosphor sheet S into the auxiliary scanning feed means 180 along the guide plates 178a, 178b. In the auxiliary scanning feed means 180, the stimulable phosphor sheet S is fed in the direction indicated by the arrow $D_1$ by the auxiliary scanning feed belt 182 until it is placed onto the guide plate 188. When the trailing end of the stimulable phosphor sheet S has moved past the image reading and recording mechanism 182, the auxiliary scanning feed belt 182 is moved in the opposite direction to displace the stimulable phosphor sheet S in the auxiliary scanning direction indicated by the arrow $D_2$. At this time, the non-illustrated vacuum pump is actuated to attract the stimulable phosphor sheet S against the auxiliary scanning feed belt 182 through the first and second suction boxes 184, 186.

While the stimulable phosphor sheet S is being fed as indicated by the arrow $D_2$, the image reading and recording mechanism 192 is energized to enable the laser beam source 194 to emit the laser beam 196. The laser beam 196 is reflected by the mirrors 198, 202 toward the galvanometer mirror 204, which is periodically swung back and forth to deflect and scan the laser beam 196 over the stimulable phosphor sheet S in the main scanning direction. At this time, the light modulator 200 is not energized since it is used for recording an image. Light emitted from the stimulable phosphor sheet S upon exposure to the laser beam 196 is applied directly or via the reflecting mirror 206 to the light guide 208. The photomultiplier 210 then converts the light from the light guide 208 into an electric signal that is supplied to the image information processing circuit 212. The stimulable phosphor sheet S is thus two-dimensionally scanned by the laser beam 196.

After the image has been read, the stimulable phosphor sheet S is delivered by the roller pair 176 along the guide plates 178a, 178b into the position between the movable guides 172a, 172b. The movable guide plates 172a, 172b have been angularly displaced to the two-dot-dash-line position by a non-illustrated drive source. Therefore, the stimulable phosphor sheet S is guided by the movable guide plates 172a, 172b into the position between the fifth feed belt 68 and the seventh feed belt 72 of the fourth feed means 66, by which the stimulable phosphor sheet S is delivered upwardly.

The stimulable phosphor sheet S is further fed upwardly by the third feed mean 58 and the second feed means 32, and then directed substantially horizontally into the eraser unit 48. In the eraser unit 48, light emitted from the erasing light source 50 erases any residual image information on the stimulable phosphor sheet S.

The stimulable phosphor sheet S from which residual image information has been eliminated by the eraser unit 48 is fed downwardly again by the second feed means 32 into the third feed means 58. The second switching guide member 76 of the fourth feed means 66 is turned to the broken-line position and the holder members 82a, 82b have been displaced in the direction of the arrow $A_1$ or $A_2$ by the motor 132 through the first displacing means 130 to select a desired sheet bin 100. The stimulable phosphor sheet S is then guided into the selected sheet bin 100 in the stacker 80 through the second switching guide member 76 and the roller pair 78. When a magazine is loaded in the first loading unit 16, the stimulable phosphor sheet S from which the image information has been erased is stored into the tray 56 disposed below the eraser unit 48.

The cassette 20 from which the stimulable phosphor sheet S has been removed is then supplied with a stimulable phosphor sheet S with image information erased therefrom which has been stored in a sheet bin 100 in the stacker 80. More specifically, the holder members 82a, 82b of the stacker 80 are displaced again in the direction of the arrow $A_1$ or $A_2$ by the motor 132 to position the stimulable phosphor sheet S with image information erased therefrom into alignment with the roller pair 78. Then, the stimulable phosphor sheet S is gripped by the roller pair 78 upon displacement of the stock plate 96 in the direction indicated by the arrow B and then fed thereby toward the fourth feed means 66. The stimulable phosphor sheet S fed to the fourth feed means 66 is delivered upwardly into the third feed means 58. Any remaining image information which may have been left on the stimulable phosphor sheet S is completely removed by the auxiliary eraser unit 64, after which the stimulable phosphor sheet S is fed into the second feed means 32. At this time, the first switching guide member 42 of the second feed means 32 has been angularly displaced to the broken-line position. Therefore, the stimulable phosphor sheet S is guided by the first switching guide member 42 to travel along the first feed belt 36, and then gripped by the roller pair 30 of the first feed means 28. Then, the roller pair 30 is displaced toward the cassette 20, and the rollers thereof are rotated in the directions opposite to those indicated by the arrows to store the stimulable phosphor sheet S into the cassette 20.

When the stimulable phosphor sheet S is fed from the auxiliary scanning feed means 180 into the fourth feed means 66 through the roller pair 176, the film delivery mechanism disposed near the second loading unit 18 is operated to enable the suction cup 214 to pick up and remove the uppermost one of stacked films F in the magazine 22. The film F removed by the suction cup 214 is gripped by the roller pair 216, which is then rotated to feed the film F into the position between the movable guide plates 172a, 172b through the guide plates 218a, 218b. The film F is gripped and fed by the roller pair 176 in the same manner as the stimulable phosphor sheet S was fed, as described above, into the auxiliary scanning feed means 180. The film F fed into the auxiliary scanning feed means 180 is delivered by the auxiliary scanning feed belt 182 in the direction of the arrow $D_1$ onto the guide plate 188. Thereafter, the film F is fed in the opposite direction indicated by the arrow $D_2$ by reversing the direction of movement of the auxiliary scanning feed belt 182. During this time, the film F is attracted to the auxiliary scanning feed belt 182 under a vacuum applied through the suction boxes 184, 186.

When the film F is fed in the direction indicated by the arrow $D_2$, the image reading and recording mechanism 192 is energized again. More specifically, the laser beam 196 is emitted from the laser beam source 194 and reflected by the mirror 198 to reach the light modulator 200. The light modulator 200 is supplied with image signal data from the stimulable phosphor sheet S which have been processed by the image information processing circuit 212 and stored in a memory means (not shown). Therefore, the laser beam 196 which has reached the light modulator 200 has been modulated by the image signal data. The modulated laser beam 196 is reflected by the mirror 20 to reach the galvanometer mirror 204, which is swung back and forth to deflect the laser beam 196 in the main scanning direction while applying the laser beam 196 to the film F. While the film F is being fed in the auxiliary scanning direction, it is scanned by the laser beam 196 in the main scanning direction. Therefore, the film F is two-dimensionally exposed to the image which has been read from the stimulable phosphor sheet S. While the film F is being exposed to the image, the photomultiplier 210 is de-energized.

After being exposed to the image, the film F is fed from the auxiliary scanning feed mean 180 into the position between the movable guide plates 172a, 172b through the guide plates 178a, 178b and the roller pair 176. The movable guide plates 172a, 172b are turned to the solid-line position to allow the film F to be gripped by the roller pair 222 of the film feed means 220. The film F gripped by the roller pair 222 is then fed upwardly by rotation of the roller pair 222, and delivered continuously upwardly by the roller pairs 224, 226. Subsequently, the film F is guided along a curved path by the guide plates 234a, 234b and fed by the roller pair 228 through the opening 236 into the receiver magazine 240. After a predetermined number of films F have been stored in the receiver magazine 240, the receiver magazine 240 is removed from the housing 12 in a light-shielded condition, and then the films F are loaded into an image developing device (not shown) to develop the images on the films F.

According to the illustrated embodiment, stimulable phosphor sheets S are inserted into and removed from the stacker 80 through one side thereof, and when removing a stimulable phosphor sheet S from the stacker 80, the stimulable phosphor sheet S can be positioned with reference to a side thereof.

More specifically, when a desired one of the sheet bins 100 in the stacker 80 is selected by operating the first displacing means 130, the engaging member 126a of the stock plate 96 defining the selected sheet bin 100 and placing a stimulable phosphor sheet S thereon reaches a position to substantially engage the engaging pin 164 of the second displacing means 150. Therefore, it becomes possible to feed a stimulable phosphor sheet S to the stacker 80, and also to feed the stimulable phosphor sheet placed on the stock plate 96 toward the roller pair 78 by operating the second displacing means 150. By displacing the stock plate 96, the positioning members 110a, 110b, 112a, 112b disposed near the opposite sides of the stock plate 96 are engaged by the respective lands 102a, 102b, 104a, 104b on the holder members 82a, 82b and displaced thereby in the directions indicated by the arrows for positioning the stimulable phosphor sheet in its transverse direction. Therefore, since the stimulable phosphor sheet S to be removed from the stacker 80 is positioned in a prescribed position, it can smoothly and accurately be fed by the fourth feed means 66 and the like. Inasmuch as stimulable phosphor sheets S are stored into and removed from the stacker 80 through one side thereof, only the single means is required to feed the stimulable phosphor sheet S into and out of the stacker 80, and hence the image reading and reproducing system 10 incorporating the stacker 80 is reduced in size.

While the rotative drive source 152 is employed in the second displacing means 150, it may be replaced with a linear actuator. More specifically, as indicated by the two-dot-and-dash lines in FIG. 1, a cylinder 250 is fixedly disposed, and engaging members for engaging the engaging members 126a, 126b of the stock plate 96 are mounted on a piston rod 252 extending from the cylinder 250. When the cylinder 250 is operated, a desired stock plate 96 is displaced back and forth with respect to the roller pair 78. Alternatively, the linear actuator may comprise a linear solenoid.

With the present invention, as described above, a stacker incorporated in an image reader or the like for temporarily storing stimulable phosphor sheets comprises holder members and a stack of stock plates slidably engaging the holder members and defining a plurality of sheet bins. A desired one of the sheet bins can be positioned with respect to a sheet feed means outside of the stacker, and when the stock plate defining the desired sheet bin is displaced toward the feed means, a positioning means is operated to transversely position the stimulable phosphor sheet placed on the stock plate. For removing a desired stimulable phosphor sheet from the stacker, a sheet bin storing the desired stimulable phosphor sheet is selected, and the stock plate defining that sheet bin is displaced toward the feed means which inserts and remove stimulable phosphor sheets into and from the stacker. Consequently, the single feed means is employed for inserting a stimulable phosphor sheet into and removing a stimulable phosphor sheet from the stacker, and the image reader or the like which incorporates the stacker therein is small in size. Since a stimulable phosphor sheet can be transversely positioned when it is removed from the stacker for an image reading process or the like, the stimulable phosphor sheet can be fed and an image can be read therefrom smoothly and accurately.

For inserting a sheet into and removing a sheet from the stacker, the roller pair for feeding the sheet to and from the stacker may be displaced in the directions indicated by the arrow $A_1$ or $A_2$, instead of displacing the stacker itself.

Although a certain preferred embodiment has been shown and described, it should be understood that many changes and modifications may be made therein without departing from the scope of the appended claims.

What is claimed is:

1. A stacker for storing a plurality of stimulable phosphor sheets, comprising:
   a sheet storage assembly having a plurality of stock plates defining a plurality of sheet bins for storing the stimulable phosphor sheets respectively therein;
   holder members holding said sheet storage assembly;
   displacing means for selecting one of said sheet bins and relatively bringing the selected sheet bin into confronting relation to a sheet feed means; and
   said stock plates having respective selective displacing means for selectively moving a desired stock plate toward said sheet feed means after said selected sheet bin is brought into confronting relation to said sheet feed means.

2. A stacker according to claim 1, wherein said displacing means comprises first displacing means for displacing said holder members back and forth to select a desired one of said sheet bins with respect to said sheet feed means, and second displacing means for engaging the selective displacing means of the stock plate which defines said desired one of the sheet bins to displace the stock plate back and forth with respect to said sheet feed means.

3. A stacker according to claim 2, wherein said second displacing means comprises a linear actuator.

4. A stacker according to claim 3, wherein said linear actuator comprises a cylinder (250).

5. A stacker according to claim 3, wherein said linear actuator comprises a linear solenoid (250).

6. A stacker according to claim 2, wherein said second displacing means comprises an actuator, a swing member swingable by said actuator, an engaging pin mounted on an end of said swing member, said selective displacing means comprising engaging members mounted on said stock plates, respectively, the arrangement being such that said engaging pin is brought into engagement with the engaging member of the stock plate, and said actuator is operated to angularly displace said swing member to displace said stock plate back and forth with respect to said sheet feed means through said engaging member and said engaging pin.

7. A stacker according to claim 1 or 2, wherein said sheet storage assembly has positioning means for positioning the stimulable phosphor sheets stored in said sheet bins, respectively, said positioning means comprising positioning members each movable in synchronism with displacement of the desired stock plate with respect to said sheet feed means for displacing the sheet on the stock plate transversely into a prescribed position.

8. A stacker according to claim 7, wherein said positioning members are swingably mounted on said stock plates, respectively, said holder members having lands engageable with said positioning members, respectively, the arrangement being such that when the desired stock plate is displaced with respect to said sheet feed means, said positioning member on the stock plate engages the corresponding land to displace the sheet on the stock plate transversely into said prescribed position.

9. A stacker according to claim 7, wherein said sheet storage means further includes auxiliary positioning members connected to said positioning members, respectively, through joint members for transversely displacing the sheets on the stock plates.

10. A stacker according to claim 7, wherein said stock plates are inclined vertically upwardly with respect to said sheet feed means and supported on said holder members for swinging movement, said sheet storage assembly further including stopper members positionally selectively mounted on said stock plates.

11. A stacker according to claim 10, wherein said stock plates have respective recesses defined in ends thereof, with the sheets respectively on said stock plates having ends positioned over said recesses, the arrangement being such that the end of the sheet positioned over the recess in the desired stock plate is moved toward said sheet feed means by displacing the stock plate toward said sheet feed means.

12. A stacker according to claim 8, wherein said sheet storage means further includes auxiliary positioning members connected to said positioning members respectively, through joint members for transversely displacing the sheets on the stock plates.

13. A stacker according to claim 8, wherein said stock plates are inclined vertically upwardly with respect to said sheet feed means and supported on said holder members for swinging movement, said sheet storage assembly further including stopper members positionally selectively mounted on said stock plates.

14. A stacker according to claim 13, wherein said stock plates have respective recesses defined in ends thereof, with the sheets respectively on said stock plates having ends positioned over said recesses, the arrangement being such that the end of the sheet positioned over the recess in the desired stock plate is moved toward said sheet feed means by displacing the stock plate toward said sheet feed means.

* * * * *